April 6, 1954    J. C. WESTMORELAND    2,674,118
GAS VISCOSITY RESPONSIVE APPARATUS
Filed July 9, 1952
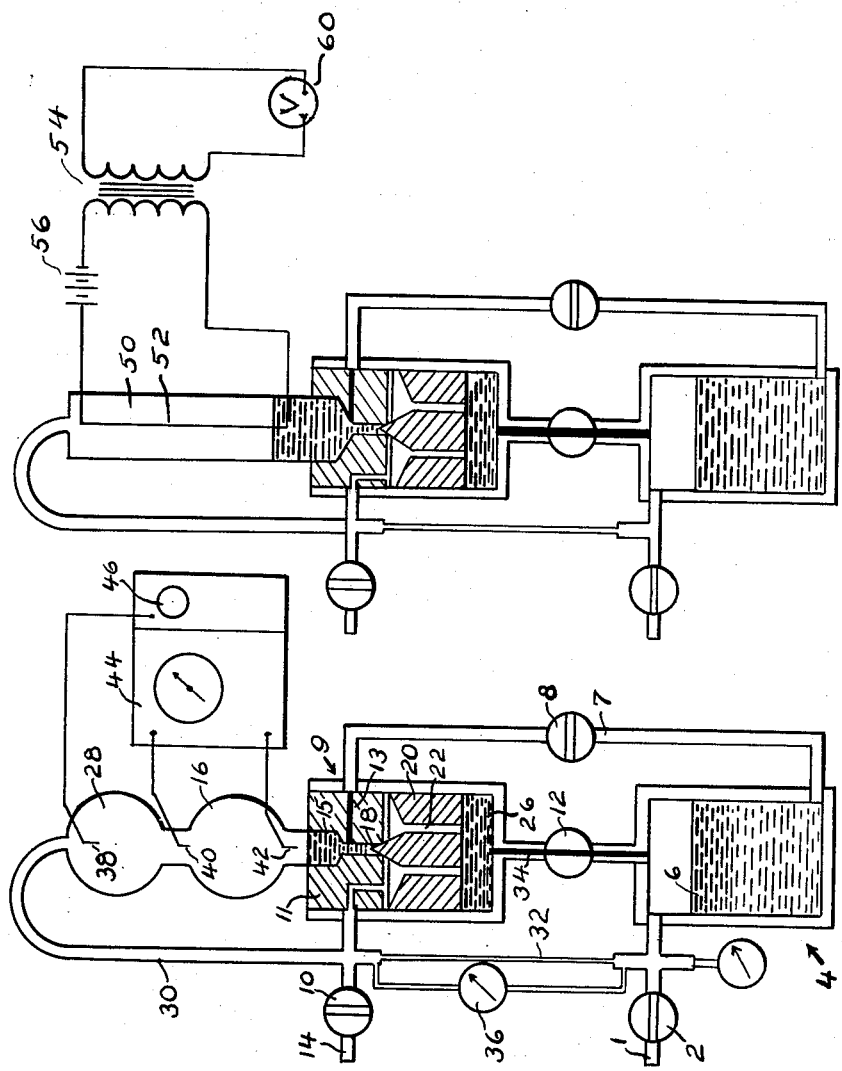
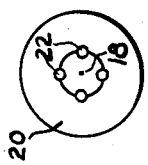
INVENTOR
JULIUS C. WESTMORELAND
BY  *Max L. Libman*
ATTORNEY Patented Apr. 6, 1954

2,674,118

UNITED STATES PATENT OFFICE 2,674,118

GAS VISCOSITY RESPONSIVE APPARATUS

Julius C. Westmoreland, Washington, D. C.

Application July 9, 1952, Serial No. 297,928

7 Claims. (Cl. 73—23)

This invention relates to a device for measuring the rate of gas flow through a capillary tube as affected by the viscosity of the gas. The accurate measurement and regulation of small gas flows is required in a known method of measuring the viscosity of a gas, which makes use of the classical equation of Poiseuille for expressing the flow of a fluid through a capillary tube. In its simplest form this equation is:

$$Q = \frac{\pi R^4}{\mu 8L} h$$

where $R$ (cm.) = radius of the tube
$L$ (cm.) = length of the tube
$h$ (gm./cm.-sec.$^2$) = pressure drop from inlet to outlet of the tube
$Q$ (cm.$^3$/sec.) = volume rate of flow at mid-section of the tube
$\mu$ (poise) = viscosity of the gas The term $$\frac{\pi R^4}{8L}$$

is constant for any one tube and therefore the variables, under conditions of constant temperature, are the pressure drop ($h$) and the viscosity. By keeping $h$ constant and accurately measuring the rate of flow of the gas in the capillary tube, it is possible to obtain a measurement of the viscosity.

Attempts have been made with some success to utilize the above relationship in determining viscosity by measuring the rate of flow of the gas under test through a capillary tube. It was found exceedingly difficult to maintain the head or pressure differential between the ends of the capillary tube sufficiently constant to permit the desired accuracy of measurement. It must be kept in mind that the total pressure drop involved is in the order of a few inches of mercury and that therefore the rate of flow in the capillary tube is greatly affected by relatively small changes in the absolute value of the head. It has been necessary, with the prior art methods of which I am aware, to spend hours in making a determination of viscosity for a single gas sample, and the final accuracy has been in the order of ±1.0%. This has been largely due to the necessity for making repeated measurements and averaging out the results due to the large possible instantaneous deviation from the mean value of the measurement taken.

My invention provides a capillary tube gas flow system wherein the factors are maintained constant to such a degree that it is possible to determine the viscosity of a gas sample in less than two minutes in the case of air at standard temperature and pressure, up to approximately three minutes in the case of helium, and the results have been consistently accurate to within ±0.5%. Furthermore, the various factors affecting the measurement are maintained so constant and the instantaneous deviations so small that it is possible to measure the instant rate of gas flow directly and continuously with sufficient accuracy for many purposes.

The accurate and rapid determination of viscosity is not only a matter of great scientific interest, but has become of increasing practical importance with the development and use of extremely long gas lines in connection with the accurate measurement and determination of the flow of gas through such lines. It is also of interest in connection with the study of high speed flight in the atmosphere. The measurement of gas flow at high temperatures has been hampered by lack of suitable techniques for measuring viscosity in the temperature region between 1000° F. and 2500° F., but my improved apparatus makes it possible to measure the viscosity of gases in this range of temperatures and also, by using a gas of known viscosity, to accurately measure temperatures directly in this same range, which is the range below that ordinarily suitable for the techniques of optical pyrometry, but above that suitable for direct thermometric measurements because of the inability of measuring elements to withstand the high temperatures long enough for accurate readings to be taken.

One form of my invention is also particularly well adapted to the accurate measurement of gas viscosity at very high pressures.

It is accordingly an object of my invention to provide an improved apparatus for rapidly and accurately measuring the viscosity of gases.

It is a further object of my invention to provide a novel apparatus for instantaneously measuring the viscosity of a gas from a small sample of the gas.

Another object is to accurately measure elevated temperatures as a function of the change of viscosity with temperature.

Still another object is to provide, in an apparatus for measuring the flow of a very small volume of a gas, novel and improved means for maintaining a very constant gas pressure differential.

Another object is to provide for the accurate measurement of gas viscosity at very high pressures.

The specific nature of the invention, as well as other objects and advantages thereof, will clearly appear from a description of a preferred embodiment as shown in the accompanying drawing in which:

Fig. 1 is a diagrammatic view, partly in section, of an apparatus embodying my invention;

Fig. 2 is a plan view, on an enlarged scale, of the float valve; and

Fig. 3 is a diagrammatic view of a modification of the invention for measuring the instantaneous rate of flow.

Referring to Fig. 1, 1 is a nipple to which is connected a source of the gas which is to be tested, 2 is a valve for controlling the flow of this gas into the apparatus, 4 is a reservoir normally nearly full of mercury, 6 and connected by a tube 7 to a float chamber 9 having a thick top closure 11 provided with a passageway 13 which provides a continuation of tube 7 and leads into passage 15 which connects to volume chamber 16 on top and is bevelled at the bottom at about 60° to form a seat for the coned point 18 of a float valve 20. Valve 20 has a number of perforations drilled in it at 22 leading to a bottom aperture 26 whereby any mercury which flows from passage 15 past the valve falls by gravity through the perforations 22 into the bottom of float chamber 9 and collects at 26. It will be apparent, that when the mercury has risen to a certain level, the float valve 20 will rise to a point where the needle valve seat 21 shuts off further flow. The float chamber, float and valve are made of methyl methacrylate resin, commonly sold as Lucite. It has been found that a Lucite valve and valve seat are not eroded by the flowing mercury, whereas a steel valve is eroded. Moreover, the mercury remains clean in contact with the Lucite.

Volume chamber 28 is connected to volume chamber 16, and a pressure equalization tube 30 leads from the top of chamber 28 to the top of the float chamber 9 as well as to the top of capillary tube 32 and also to a nipple 14 for connection to a vacuum pump (not shown), this last connection being controlled by cock 10. From the bottom of float chamber 9 a tube 34, in which flow can be controlled by cock 12, leads to the top of reservoir 4. A differential pressure gauge 36 may be connected across the capillary tube 32 to indicate the difference in pressure between the ends of the tube.

The volume chamber has two sections, 16 and 28, which are made of glass with a necked section between the two and at the base of the lower. Platinum contact wires, 38, 40 and 42 are sealed into these neck sections, and the top of the upper bulb 28. These wires are bent downward to give sharp "break" signals. The primary purpose of the necked sections is to have a small cross-sectional area at the plane of the contact break.

Contact wires 40 and 42 lead to a conventional electric timer 44 and are so arranged that when the level of mercury in chamber 16 falls sufficiently to break contact with the wire 40, the timer is started, and when the mercury has fallen so that it breaks contact with wire 42, the timer stops, giving an accurate indication of the time to displace the volume of mercury between these two levels with the gas being measured. This volume can be easily and accurately determined by weighing the amount of mercury which is so displaced. Contact wire 38 is connected to a signal lamp 46 which lights when it is contacted by the mercury in chamber 28, giving a signal to indicate that chamber 28 is full and the apparatus is ready for the beginning of a test run.

The operation of the above apparatus will now be described.

The first step in preparing the apparatus for use is to determine the volume of the chamber 16 between contact points 40 and 42. This may be done very conveniently before the volume chamber unit 16 is joined to the float chamber 9. Also, while not essential, it may prove convenient later on to know the volume of chamber 28 between contact points 38 and 40, and its determination at this time involves very little extra work.

To determine the volumes of the chambers, they are filled with mercury from an auxiliary reservoir, then the mercury is withdrawn. As the mercury surface in the volume chamber breaks from contact 28 (or 40) the discharge is diverted into a weighing flask. As the mercury surface breaks from contact 40 (or 42) the flow is stopped. From the weight and temperature of the mercury collected, the volume is calculated.

In making this volume calibration, it is necessary to always have the mercury surface falling when the observations or setting are taken at the contact points. The primary reason for this is that this is the direction in which the mercury surface will be moving when the apparatus is in use. For indicating when the mercury surface breaks from the contact both visual observations and an electric continuity meter have been used.

Next, the several parts of the apparatus are assembled, using suitable cements. After assembling, the apparatus is washed with dilute nitric acid, thoroughly rinsed with distilled water and then with alcohol, and dried. Finally the reservoir is filled with slightly more than enough mercury to fill both chambers 16 and 28 and the base of the float chamber. The apparatus is now ready for use.

It is appropriate to mention that the materials of construction and method of assembly described above are suitable for use under gas pressures (absolute), ranging from a few millimeters of mercury to about two atmospheres. Modifications which will permit the apparatus to be used under higher pressures will be discussed later.

Referring to Fig. 1, with all of the mercury in the reservoir 4, valve 2 is closed and cocks 8, 10, and 12 open, a high vacuum pump is connected at 14 and the entire unit is purged of all gas as completely as possible. Then cocks 10 and 12 are closed and the gas sample inlet valve 2 is opened. This must be done with some care since the rate of pressure increase in 4 must not be too rapid, and yet it must be at a much greater rate than gas will flow through the capillary tube. This will cause the mercury to rise through the tube 7 into the passage above the float valve. Since cock 12 is closed, the mercury will first fill the float chamber enough to close the float valve, and thereafter will fill the volume chambers 16 and 28. When the mercury has reached contact 38, which signal 46 will indicate, cock 8 is closed manually. The inflow of gas is continued until the pressure within reservoir 4 has reached the desired value, when valve 2 is closed.

Before starting a measurement or run, a sufficient time interval must elapse for pressure conditions to equalize throughout the system. The following conditions then exist: Cocks 12 and 8 are closed. The mercury in the float chamber has raised the float so that the valve point 18 is pressed firmly enough against its seat that no mercury can flow from 16 into 9. The gas pressure is the same in reservoir 4, the float chamber 9 and the top of chamber 28.

To place the apparatus in operation, cock 12 is opened. The set of conditions which will be established when a steady rate of flow is reached are: The outflow of mercury from pool 26 will lower the float and valve admitting mercury from chamber 16 into float chamber 9. Since this inflow from chamber 16 exceeds the outflow, the float and valve will be raised, choking down the rate of inflow. Due to the pressure equalizing tube 30, the gas pressure in the upper part of the valve chamber 9 will be the same as that above the mercury in chamber 28. The head "$h$" producing the flow is equal to the vertical height from the surface of the mercury in the float chamber to the outflow point of the tube 34 below valve 12. This may be determined by the use of a cathetometer or by a differential manometer or a pressure gauge 36 connected between the capillary tube terminals, as shown.

In order that the above conditions may be attained, it is necessary that the passage from float chamber to reservoir 4, especially at the outlet end, shall be very small. In some apparatus the lower part of this tube has been made so small that, with a trap at the end, only one or two drops of mercury emerged from the trap per second. That the height from the mercury surface in the float chamber to the tube outlet is equal to the pressure drop across the capillary tube has been established by many pairs of measurements. However, it should be noted that this holds only when cock 12 is wide open. If, as in some models, cock 12 is replaced by a needle valve, and the rate of the mercury flow is regulated by this valve, the equality between the height of the mercury passage and the pressure drop will not obtain. It will then become necessary to use a manometer across the capillary tube.

Again, it has been found that there is no "hunting" action of the float valve in maintaining the rate of outflow from chamber 16 equal to that from float chamber 9. However, the flow through the float valve must be in the laminar region.

Since the gas pressure in the float chamber is the same as that above the mercury in chambers 16, 28, the pressure or force of the mercury upon the projected area of the point of the valve will vary with the height of the mercury in 16, 28. The opposing force exerted by the valve is derived from the buoyant action of the mercury upon the float. As this force must be greater when 16, 28 are full than when nearly empty, it follows that the depth of the mercury in float chamber 9 will be greater at the start than at the end of a run. Calculations have shown that this change in depth is very small, about 0.0014 cm. In the model to which this value applies, this would be equivalent to a decrease in $h$ of less than 0.01%.

In this type of operation the rate of flow of the mercury, at equilibrium, will be determined by the quantity of gas that the pressure differential $h$ can force through the capillary restriction 32 at test conditions. If the capillary 32 were blocked, then no gas could enter the metering chamber and there would be no mercury flow into the chamber 4. A hydrostatic balance would then exist where the gas pressure ($P_E$) in the chamber 4 less the pressure ($P_B$) in the measuring chamber 16, 28 and the float chamber 9 would be equal to the value of the mercury column $h$. This condition represents the zero flow point, above which flow rates may be obtained over a range governed by the cross-section and shape of the discharge section of the mercury passage. Beyond this range the condition of hydrostatic balance can no longer be said to exist and pressure losses in the discharge section are of a magnitude where they must be taken into account.

In place of an on-off valve, a regulating valve may be used for 12. In this case, the outflow tube should be of uniform size throughout. Also, the vertical distance represented by $h$ in Fig. 1, would not be a measure of the pressure drop across the capillary tube. This pressure drop would now have to be measured with a manometer. Operation of the meter with this type of a valve has been called "restricted" operation.

It was mentioned that with the type of construction described, the maximum pressure at which the apparatus can be used with safety, is about 2 atmospheres, absolute. One method for overcoming this limitation is to place the apparatus within a suitable pressure chamber. This necessitates pressure connections into the enclosing chamber as well as electrical connections for the signaling contacts. Also some provision must be made for operating the cocks 8 and 12 or the connecting lines to them may be brought outside.

An alternative procedure to the above is to make the volume chambers 28, 16, the float chamber 9 and the reservoir 4 of steel.

Since the viscosity of a gas changes rapidly with a change of temperature, one of these apparatuses may be used for temperature measurements. For such use, the capillary tube would be coiled into a compact sensing unit. The unit would be charged once for all with a suitable gas. The time interval will be a measure of the average relative temperature, or actual temperature after a calibration has been made, over the time interval.

In such an arrangement and use as here suggested, some form of pump may be used for transferring the mercury from the reservoir to the measuring chamber, or this may be done gravimetrically by inverting the unit.

The apparatus may be modified so as to indicate the rate of flow of a gas sample. This modification, which is shown schematically in Fig. 3, is made by replacing the chamber unit 16, 28, with a uniform bore tube 50. The contact points are replaced by a fine platinum resistance wire 52 mounted along the axis of the tube. The ends of this wire are connected to the primary winding of an iron core transformer 54 and supplied from a source of D. C. current 56. As the mercury surface falls, the resistance in the circuit increases with a corresponding drop in the primary current and degree of magnetization of the primary winding. This induces an emf in the secondary winding, the strength of which will depend upon the rate of change in the primary. This secondary winding voltage may be obtained with a suitable type of voltmeter 60 and by calibration, the volume rate of mercury flow and of the gas also, may be read directly from the volt-meter.

Obviously, this arrangement can be combined with the temperature sensing element mentioned above. In this case the voltmeter could be calibrated to indicate temperature, since the rate would vary proportionally with the temperature of the gas.

A temperature measuring device constructed as indicated above has one unique advantage. By making the capillary tube 32 of metal or metallic alloy which can withstand high temperatures for an appreciable time, accurate temperature measurements can be made even in a temperature range so high that the tube walls are breaking down during the measurement. As long as the inside of the tube remains intact, the measurement will still be accurate. This is not true of other types of temperature sensing elements, e. g., a resistance wire, since as soon as the wire begins to decompose or erode due to the high temperature, resistance measurements taken as an indication of the temperature will no longer be accurate. Thus, by making the apparatus, which uses very little metal, easily replaceable and connecting it to nipples of highly refractory, thick walled material, it will be apparent that accurate direct temperature measurements can be taken in a region and under conditions very difficult to measure by any other means.

In practice, it has been found that the apparatus described maintains the pressure differential across the capillary tube at a remarkably constant level, which is believed to account for the high degree of repeatability and accuracy obtained. It will be noted that once the system is stabilized, there is no appreciable "hunting" action whatever. The float valve 20 apparently acts as a highly damping resistance element and lets in the mercury in very small, very uniform increments which permits h to vary by only a small fraction of one percent, thus preventing the building up of pressure oscillations which would otherwise tend to occur in the closed gas circuit, with resultant large deviations of instantaneous pressure and impairment of accuracy.

It will be noted that the tube 34 is made of sufficiently small diameter so that if the pressure in reservoir 4 is the same as in tube 30, the mercury will remain in the tube despite the opening at the bottom of the tube, and the system will remain hydrostatically balanced. However, even if the tube 34 is made sufficiently large so that leakage from the tube cannot be prevented, this will not necessarily affect the operation of the system shown in Fig. 1, as long as the flow in the capillary 32 is not less than the leakage from tube 34 for under these conditions float valve 20 will still need to operate to admit even more mercury than is leaking and the tube 34 will remain full of mercury.

A particular advantage of the arrangement shown is that the reservoir 4 acts also as a filter to trap any impurities or mercury compounds which may form. These impurities will float on the surface of the mercury 6 in the reservoir and since mercury is withdrawn from the bottom of 6, the impurities will not get into the valve system and so can do little harm.

The system described maintains the rate of flow of mercury constantly regardless of the quantity of mercury remaining in the chamber above. As mercury leaves the chamber 16, 28, it is replaced by an equal volume of gas flowing from the capillary tube 32. The pressure head creating the gas flow is equal to the vertical distance from the surface of the mercury in the float chamber 9 to the bottom outlet of the tube 34. The timer 44 shows how long it takes for the volume of gas (at this pressure differential) between 40 and 42 to flow through capillary tube 32. From the volume represented between contacts 40 and 42 the rate of flow, Q in Poiseuille's formula, may be computed, and this in turn readily gives viscosity.

It will be apparent that the embodiments shown are only exemplary and that various modifications can be made in construction and arrangement within the scope of my invention as defined in the appended claims.

I claim:

1. Means for determining the viscosity of a gas comprising a closed system adapted to contain a quantity of gas to be tested, said system including a capillary tube, a gas and liquid reservoir having a connection from the top thereof to one end of said capillary tube for supplying gas under pressure to said one end of said capillary tube, a displacement chamber at a higher level than said reservoir, a gas conduit connecting the top of said chamber to the other end of said capillary tube for receiving gas thererrom, a quantity of liquid of greater density than the gas being tested in said displacement chamber, a float chamber between said displacement chamber and said reservoir, a conduit for admitting liquid from the displacement chamber to said float chamber by gravity flow, a liquid conduit between the bottom of said float chamber and the top of said reservoir, a float valve in said float chamber for metering the rate of liquid flow from said displacement chamber to said reservoir, a gas pressure equalizing conduit from the top of said displacement chamber to the top of said float chamber, and means responsive to the rate at which liquid passes from said displacement chamber to said reservoir, said gas and liquid reservoir having at least sufficient capacity to hold all of the liquid in the system at one time.

2. Means for maintaining a constant gas pressure comprising a gas and liquid reservoir, a gas outlet aperture in the upper portion of said reservoir, a liquid inlet tube connected to the upper gas containing portion of said reservoir, a float valve chamber connected to said tube for controlling supply of liquid to said tube, and a liquid supply chamber connected to said float chamber for supplying liquid thereto, whereby the float chamber is effective to maintain a constant head of liquid in said liquid inlet tube.

3. The invention according to claim 2, and an enclosed gas system including said float chamber, whereby a gas pressure difference is maintained between gas in the enclosed system and gas in the reservoir, depending on the head of liquid in said liquid inlet tube.

4. Means for determining a function of the viscosity of a gas comprising a closed system adapted to contain a quantity of gas to be tested, said system including a capillary tube, a reservoir for supplying gas under pressure to the end of said capillary tube, and means for maintaining a constant pressure of said gas in said reservoir comprising a displacement chamber at a higher lever than said reservoir, a quantity of liquid in said displacement chamber, a float chamber at an intermediate level between said displacement chamber and said reservoir, a passage for admitting liquid from said displacement chamber to said float chamber by gravity flow, a liquid gravity conduit between said float chamber and the top of said reservoir said conduit being normally open at the bottom and of sufficiently small internal diameter to retain liquid in static balance therein when the pressure at the bottom of said conduit equals the head of the liquid in said conduit, a gas pressure equalizing conduit from the top of said displacement chamber to the top of said float chamber, means for indicating the rate at which liquid passes from said displacement chamber to said reservoir, said reservoir having at least sufficient capacity to hold all of the liquid in the system at one time.

5. The invention according to claim 4 including a valve in the conduit between the bottom of the float chamber and the top of the reservoir said valve being adjustable to restrict the rate of flow of liquid in said conduit.

6. The invention according to claim 4 including means for transferring liquid within the closed system from the liquid and gas reservoir to the displacement chamber.

7. The invention according to claim 6 wherein said last-named means comprises a liquid conduit from the bottom of said reservoir to said displacement chamber, and a shut-off valve in said conduit.

References Cited in the file of this patent

UNITED STATES PATENTS

| Number | Name | Date |
|---|---|---|
| 1,630,307 | Norwood et al. | May 31, 1927 |
| 1,884,896 | Smith | Oct. 25, 1932 |

OTHER REFERENCES

The advanced Treatise on Physical Chemistry, vol. 1, J. R. Partington, pgs. 876–881; QD, 453, P3.